Aug. 13, 1929.  W. W. BLAKELY  1,724,556
VEHICLE SHIPPING APPARATUS
Filed Nov. 3, 1924   4 Sheets-Sheet 1
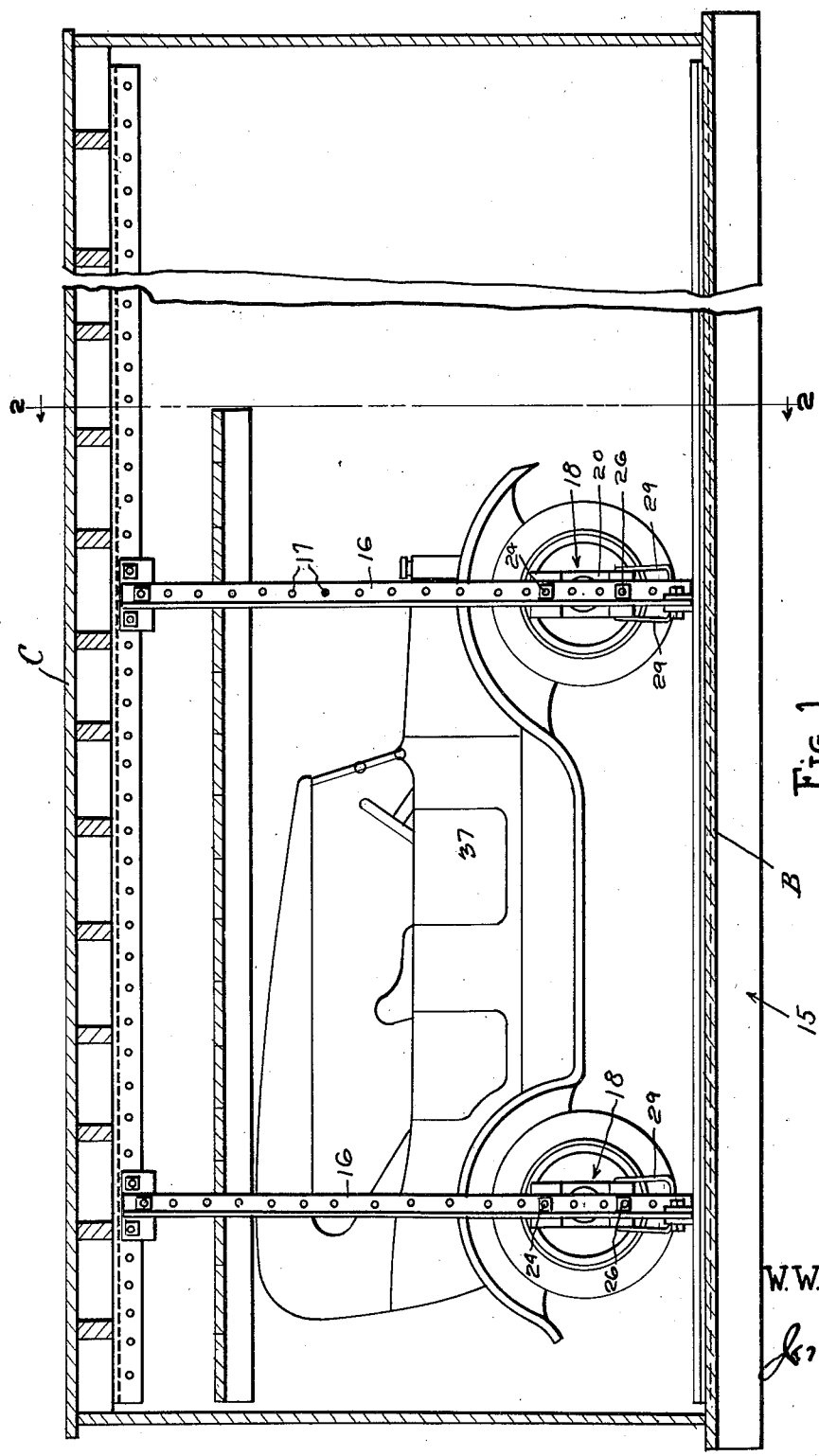
Inventor
W. W. BLAKELY,
Jerry A. Mathius
Attorney

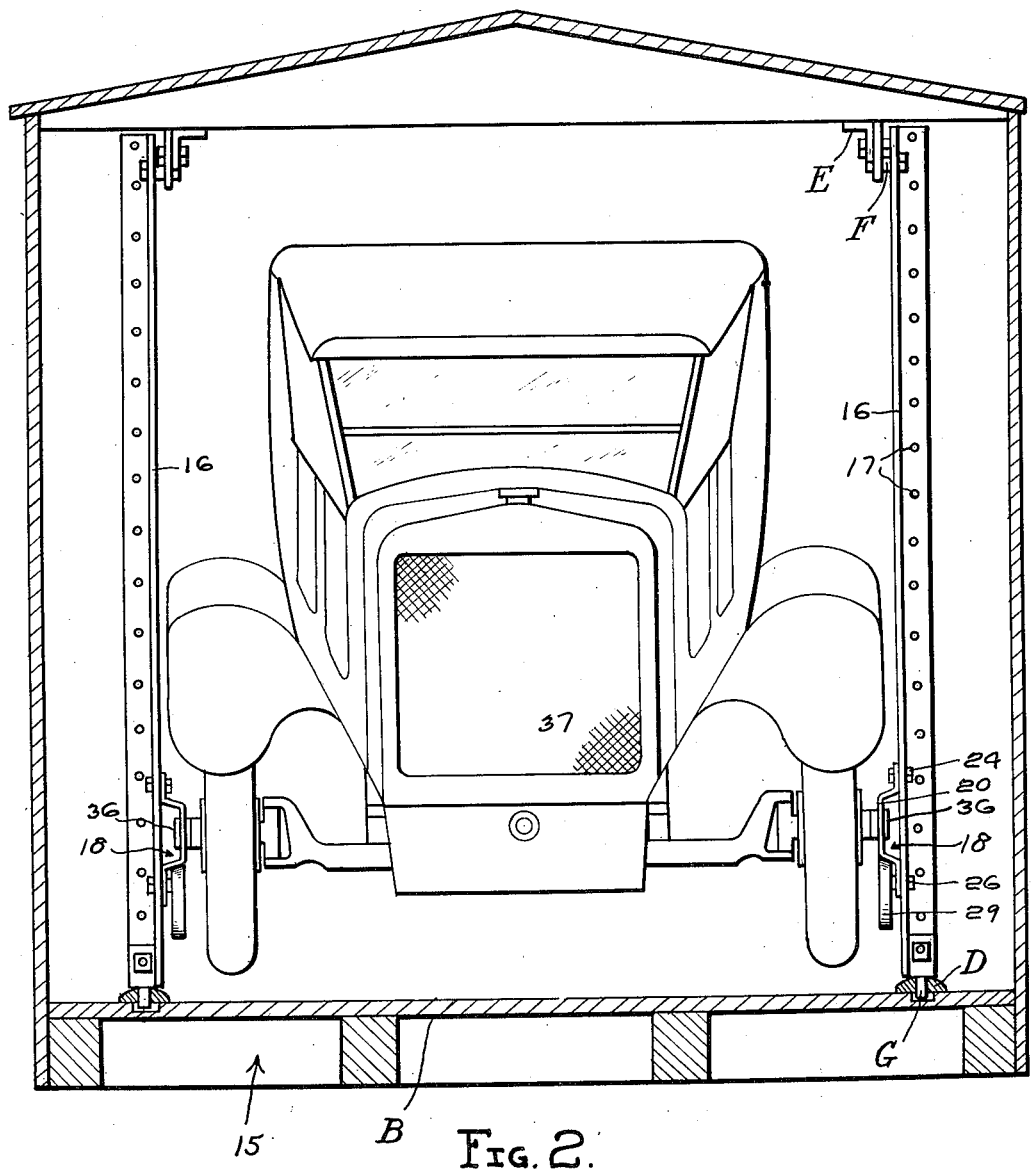

Aug. 13, 1929.   W. W. BLAKELY   1,724,556
VEHICLE SHIPPING APPARATUS
Filed Nov. 3, 1924   4 Sheets-Sheet 3
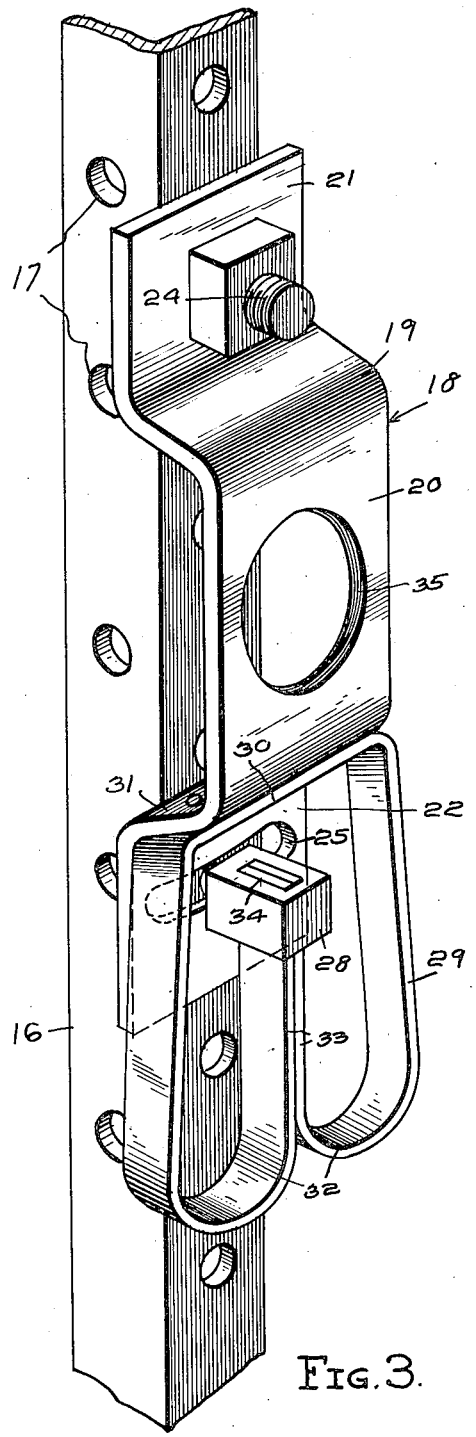
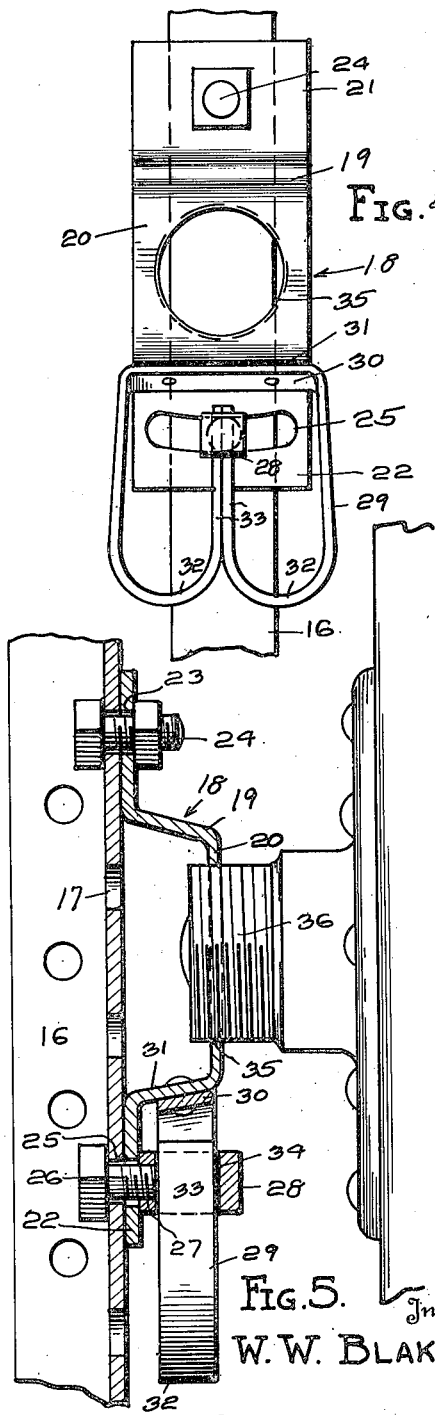
Fig. 4.
Fig. 5.
Fig. 3.
Inventor
W. W. BLAKELY,
By Jerry A. Mathens,
Attorney Aug. 13, 1929.    W. W. BLAKELY    1,724,556

VEHICLE SHIPPING APPARATUS

Filed Nov. 3, 1924    4 Sheets-Sheet 4

Inventor
W. W. BLAKELY,
Jerry A. Mathews,
Attorney

Patented Aug. 13, 1929.

1,724,556

UNITED STATES PATENT OFFICE.

WILLIAM W. BLAKELY, OF DEXTER, MICHIGAN.

VEHICLE-SHIPPING APPARATUS.

Application filed November 3, 1924. Serial No. 747,665.

My invention relates to improvements in anchoring apparatus for retaining an automobile or like vehicle, in place, during shipment in or upon a railway car, or other transporting vehicle.

An important object of the invention is to provide apparatus of the above mentioned character, which is rigid against downward vertical loads, and yieldable within limit, against horizontal loads, whereby the movement of the automobile or the like, in transportation, due to jerks and jars, is properly absorbed without liability of injury to the automobile.

A further object of the invention is to provide apparatus of the above mentioned character, which engages with parts of the automobile, and is adapted to entirely support the automobile, thereby taking the entire load off of the tires, with the result that the usual rim cutting of tires, will not occur, as frequently happens when automobiles are shipped by rail with the tire inflated, and one or more of the tires become flat.

A further object of the invention is to provide apparatus of the above mentioned character, having parts which are adapted to engage with the hubs of the wheels of the automobile being transported, in a manner to render it impossible for accidental displacement to occur.

A further object of the invention is to provide apparatus of the above mentioned character which is strong, durable, and easy to use.

A further object of the invention is to provide an automobile part engaging member, which is adapted for use in connection with the railway car construction, shown in my co-pending application Serial No. 747,664 filed November 3, 1924, herewith, but is not necessarily restricted to this use.

Other objects and advantages will be apparent during the course of the following description.

Figure 6:
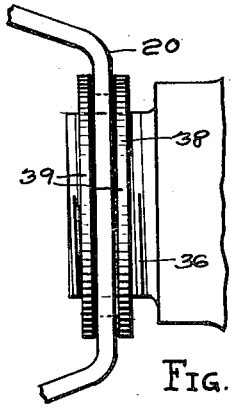
Figure 8:
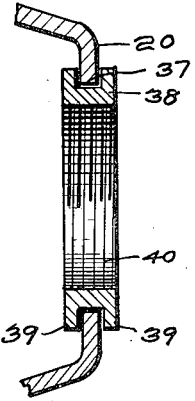
Figure 7:
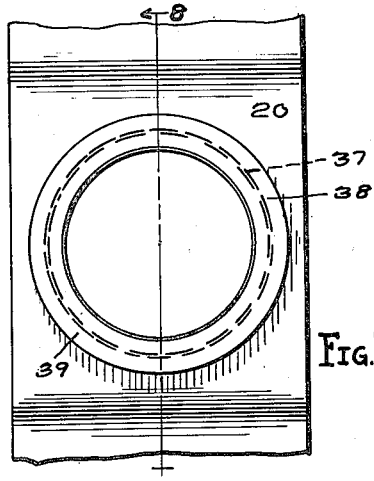
Figure 9:
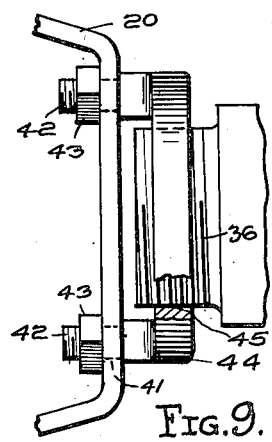
Figure 11:
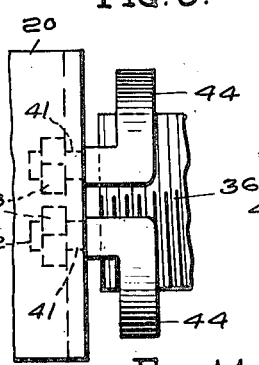
Figure 10:
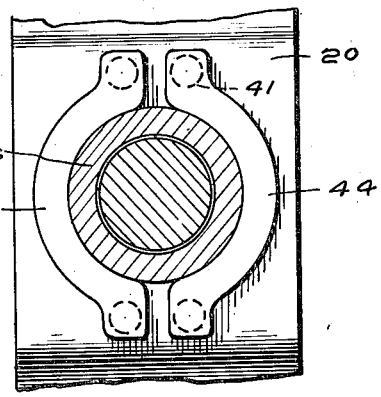
Figure 12:
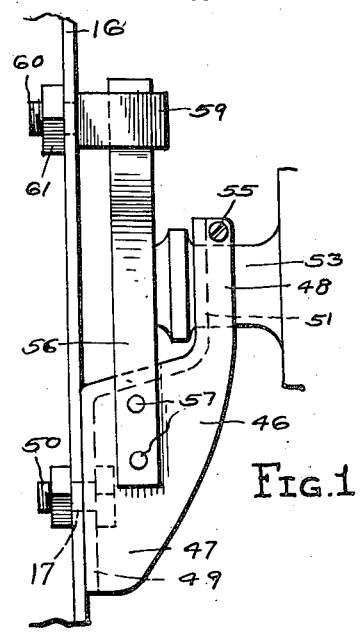
Figure 13:
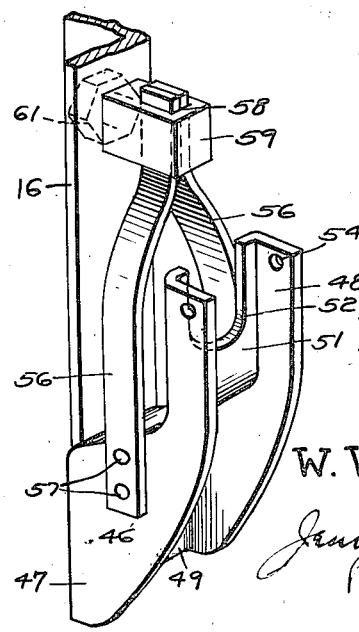

In the accompanying drawings forming a part of this specification, and in which like numerals are employed to designate like parts through the same, Figure 1 is a longitudinal sectional view through a railway car, upon one side of the standards, showing the apparatus embodying my invention, Figure 2 is a transverse section taken on line 2—2 of Figure 1, Figure 3 is a perspective view of one of the supporting and connecting devices, Figure 4 is a front elevation of the same, Figure 5 is a central vertical longitudinal section through the same, showing the hub in place, Figure 6 is a side elevation, parts broken away, of a modified form of supporting and connecting device, Figure 7 is a front elevation of the same, Figure 8 is a transverse section taken on line 8—8 of Figure 7, Figure 9 is a fragmentary side elevation of a further modified form of supporting and connecting device, Figure 10 is a front elevation of the same, Figure 11 is a plan view of the same, Figure 12 is a side elevation of a still further modified form of supporting and connecting device, and, Figure 13 is a perspective view of the same.

Referring now to the drawings, it will be noted that I have illustrated this invention as used in connection with a suitable carrier such as for example a railway car 15 having the customary flooring B and roof construction C. Secured to the flooring and roof aforesaid adjacent the sides of the carrier and extending longitudinally thereof, are suitable attaching rails D and E respectively. Extending between these rails and adjustably secured thereto are the upright standards 16. As shown these standards are preferably formed of angle irons and are provided with a plurality of spaced openings 17 therein. In order to secure the upper and lower ends of the standards to the rails E and D respectively the attaching elements F and G are provided. The attaching elements F and G are carried respectively by the upper and lower ends of the standards and are adapted to detachably and adjustably engage the rails. The specific form of attaching elements utilized and the manner in which the same cooperate with the rails to effect the adjustment of the standards longitudinally of the carrier, is fully set forth in my copending application above identified and accordingly will not be described in detail herein.

Arranged upon the inner sides of the standards 16, are supporting and connecting devices, designated as a whole by the numeral 18. These devices are identical, and a description of one will therefore be sufficient for all. Attention is now invited to Figures 3 to 5 inclusive, wherein the devices are shown as embodying a body portion 19, preferably formed of suitably stout strap iron. The body portion 19 includes a central U-shaped portion 20, provided at its upper end with an upwardly projecting extension 21, and at its lower end with a downwardly projecting extension 22. The upper extension 21 has an opening 23, for the reception of a bolt 24, which is passed through a selected opening 17. The bolt 24 thus rigidly holds the body portion 19 against vertical downward movement, but pivots the same, so that it may partake of restricted swinging movement, in a vertical plane, longitudinally of the body 15 of the car.

The lower extension 22 is provided with a curved slot 25, adapted to receive a machine bolt 26, passed through one of the openings 17, as shown. This machine bolt is screw threaded into an opening 27, formed in one end of a block 28. It is obvious that the block 28 functions as a nut for the bolt 26 and retains the lower extension 22 close to the standard 16, but permits of its swinging movement.

The numeral 29 designates an inverted generally double U-shaped spring, having the desired strength and stiffness. This spring has its base 30 riveted or otherwise rigidly attached to one arm 31 of the U-shaped body portion 20. The spring 29 depends vertically from this U-shaped body portion, and the ends of the same are bent inwardly producing curves 32, and these curves extend upwardly in the form of straight fingers 33, preferably arranged in contracting relation. The upper ends of these fingers are held within an opening 34, formed in the block 28.

The U-shaped portion 20 is provided preferably at its center with a screw threaded opening 35, for receiving and having screw threaded engagement with the hub 36 of the automobile 37, the cap of the hub being moved.

In the use of this form of the invention, the automobile is moved between the pairs of standards, to assume any desired position. A supporting and connecting device is now attached to each wheel of the automobile, and this is accomplished by placing the body portion 20 upon the screw threaded hub 36, after the removal of the cap. The device 19 is now bodily rotated until the hub 36 is screwed well into the opening 35. Each device being thus securely mounted upon the hub, the device is positioned vertically, and the car may be shifted to a proper position so that the device will come in close relation to the adjacent standard 16. The bolt 24 is now passed through the openings 17 and 23 and the machine bolt 26 passed through the lower opening 17 and screwed into the opening 27 of the block 28. The body portion 19 may be thus secured to the standard while the tires are inflated and carry the weight of the machine. If desired, the automobile may be elevated or jacked up to any selected elevation. With the several supporting and connecting devices thus attached to the standards and to the hubs of the automobile, it will be seen that the automobile is rigidly supported with respect to vertical movement, while the same is free to partake of restricted longitudinal shifting movement. These longitudinal shifting movements caused by the travel or jerking of the railway car, are properly absorbed by the springs 29, acting upon the body portions 20, to retard their swinging movement.

In Figures 6 to 8 inclusive, I have shown a slight change in the construction of the body portion 20. Instead of employing the screw threaded openings 35, I equip the body portion 20 with an opening 37, similarly located, but having its wall smooth. This opening receives a rotatable or swiveled connecting element 38, having flanges 39, holding the same within the openings 37. The connecting element 39 is in the form of a ring and has its bore screw threaded, as shown at 40, for receiving and having screw threaded engagement with the screw threaded hub 36. All other parts of the device remain identical. The advantage in the construction shown in Figures 6 to 8 is that the entire connecting device is not rotated when applying the same to the hub of the wheel, but the ring 38 alone is turned. Otherwise, the use of this form of the invention is identical with the first use described.

In Figures 9 to 11 inclusive I have shown a further slight modification. In these Figures, the body portion 20 has no opening 35, but is provided with four small openings 41, for receiving reduced shanks 42, screw threaded at their ends, to receive nuts 43. These shanks carry approximately semi-circular companion members 44, which constitute a socket. The shanks are disposed at a right angle to the companion members and the companion members are disposed upon the outer side of the body portion 20, and are parallel thereto. The curved companion members 44 are preferably provided with screw threads 45, to interfit with the screw threads of the hub 36. All other parts of the device remain identical, as described in connection with the first form of the invention.

In the use of the companion members 44, they are not rotated upon the hub 36, but simply placed thereon by a laterally movement, and their screw threads interfit with the screw threads of the hub. The shanks 42 are passed through the openings 41, and the nuts 43 then applied. The operation of the device is otherwise identical with that of the first form of the invention, and no further explanation is thought to be necessary. I might state that this form of the invention is not necessarily restricted to the screw threads 45 upon the companion members 44, as these may be omitted.

In Figures 12 and 13 I have shown a modified form of supporting and connecting devices, embodying a supporting bracket or chair 46, preferably formed of pressed sheet metal or the like. This bracket embodies a lower body portion 47, and an upper portion 48, offset inwardly and laterally from the upper body portion. The lower body portion has a side web 49, apertured for receiving a bolt 50, which is passed through one of the openings 17. It is thus seen that the bracket or chair 46 is pivotally supported near its lower end, allowing the upper portion thereof to swing in a vertical plane about the bolt 50 as a pivot, against the action of the springs 56. The upper offset portion 48 is provided in its web 51, with a U-shaped opening or notch 52, adapted to receive the small portion of the hub 53. Openings 54 are preferably provided, for receiving a bolt or pin 55, serving to lock the hub within the opening 52, against vertical displacement.

Arranged upon opposite sides of the bracket or chair 46 are suitably stiff and strong leaf springs 56, rigidly secured to the upper end of the body portion 46, as indicated at 57. These leaf springs converge upwardly, and their upper ends are held within an opening 58, in a block 59. This block carries a threaded shank 60, passed through one of the openings 17, and held therein by means of a nut 61.

In view of the foregoing description, it is thus seen that the bracket or chair 46 will support the hub of the wheel rigidly against vertical movement, but will swing, within limits, longitudinally of the railway car. These swinging movements are opposed by the springs 56, which accordingly take up the shocks.

It is to be understood that the forms of my invention herewith shown and described, are to be taken as preferred examples of the same, and that various changes in the shape, size, and arrangement of parts, may be resorted to, without departing from the spirit of my invention, or the scope of the subjoined claims.

Having thus described my invention, I claim:

1. The combination with a support, of a supporting and connecting member pivotally connected with the support and having means for engaging with the hub of an automobile or the like, and automatically acting yielding means to oppose the swinging movement of the member upon its pivot.

2. The combination with a support, of a supporting and connecting member pivotally connected with the support and having means for engaging with the hub of an automobile or the like, a spring element connected with the member to oppose its swinging movement, and means for connecting the spring element with the support.

3. The combination with a support, of a supporting and connecting member having means for engaging with the hub of an automobile or the like, means for pivotally connecting one end of the member with the support, a spring element connected with the member and extending longitudinally thereof beyond the opposite end of the same, and means for connecting the free end portion of the spring element with the support.

4. The combination with a support, of a supporting and connecting member provided with means for screw threaded engagement with the hub of an automobile or the like, and means for connecting the member with the support, the last named means rigidly holding the member against downward movement and yieldingly opposing its lateral movement.

5. The combination with a support, of a supporting and connecting member having means to engage with a part of an automobile, and means for connecting the member with the support, the last named means rigidly holding the member against downward movement and yieldingly opposing its lateral movement.

6. The combination with a support, of a swinging supporting and connecting member carried thereby and having a screw threaded portion to engage with the hub of an automobile, and automatic yielding means to oppose the swinging movement of the member.

7. The combination with a support, of a supporting and connecting member pivotally mounted thereon, a swiveled screw threaded ring carried by the member to engage upon the screw threaded hub of an automobile, and automatic yielding means to oppose the swinging movement of the member.

8. The combination with a support, of a member provided near one end with a transverse slot and having means arranged between its ends to engage with a part of an automobile, means pivotally connecting the opposite end of the member with the support, a spring connected with the member, and a bolt connected with the support and passing through the slot and having connection with the spring.

9. In a device of the class described, the combination with a support, of a substantially U-shaped member provided upon its base with hub engaging means and having extensions at its ends, one extension having a slot, a pivot element connecting one extension with the support, a generally U-shaped spring secured to the member, and an element carried by the support and passing through the slot and connected with the spring.

10. In a device of the character described, the combination with a support, of a supporting and connecting member connected with the support and adapted to engage with a part of an automobile or other load for retaining the automobile or other load suspended, said connection being such that the supporting and connecting member may partake of lateral movement, and elastic means to oppose such lateral movement.

11. In a device of the character described, a support, a supporting and connecting member connected with and suspended from the support and adapted for connection with a part of an automobile or other load to retain the same suspended, said connection being such that the automobile or the load may partake of general horizontal movement, and elastic means to oppose the general horizontal movement of the automobile or other load.

12. In a device of the class described, a carrier, attaching beams secured in the upper portion of the carrier, base rails secured in the lower portion of the carrier, standards connected with the attaching beams and base rails, and supporting devices connected with and supported by the standards, said supporting devices engaging with parts of an automobile or the like and adapted to hold the same suspended, said supporting devices embodying resilient means to permit of and oppose longitudinal shifting movements of the automobile.

13. In a device of the class described, a carrier, standards attached thereto, supporting devices adapted to engage with parts of an automobile or the like, adjustable means for attaching the connecting and supporting devices at a suitable elevation with the standards whereby the supporting devices will suspend the automobile or the like, said supporting devices permitting of the longitudinal shifting movement of the automobile or the like, and elastic means to oppose such longitudinal movement.

14. The combination with a railway car, of standards arranged thereon, attaching members extending longitudinally of the carrier and secured thereto, means whereby the standards may be secured to the attaching members at selected longitudinal positions upon the carrier, and supporting devices connected with and supported by the standards and adapted to engage with parts of an automobile to hold the same suspended.

15. The combination with a carrier, of attaching beams mounted in the upper portion thereof and extending longitudinally for the major portion of the length of the carrier, base rails mounted in the lower portion of the carrier and extending for the major portion of the length of the carrier, standards, adjustable means whereby the standards may be connected with the attaching beams and base rails at selected longitudinal positions thereon, and supporting devices connected with and supported by the standards and engaging parts of an automobile or the like to suspend the same.

16. A shipping device for vehicles comprising a standard, a member swingingly mounted upon the standard and having a portion engageable with a part of the vehicle, and means associated with said member for restricting the swinging movement thereof.

17. A shipping device for vehicles comprising a support, a member having means for engagement with a part of the vehicle, said member swingingly mounted upon said support affording longitudinal movement of the vehicle, and resilient means associated with said member for restricting the longitudinal movement of the vehicle.

18. A shipping device for vehicles comprising a support, of a member swingingly mounted upon said support and having a substantially U-shaped portion for receiving a part of the vehicle, and yieldable means secured to said member for opposing the swinging movement thereof.

19. A shipping device for vehicles comprising a support, means on the support for holding the vehicle in elevated position including a member capable of limited movement relative to said support and having a substantially U-shaped portion provided with a screw-threaded opening for receiving the hub of said vehicle.

20. A shipping device for vehicles comprising a support, means on the support for holding the vehicle in elevated position including a member swingingly mounted upon said support and having a substantially U-shaped portion for receiving the hub of the vehicle.

21. A shipping device for vehicles including an upright support, means on the support for holding the vehicle in elevated position, said means including a member having the end portions thereof connected to said support and having an intermediate bowed portion spaced from the support and apertured to receive the hub of the vehicle.

22. A shipping device for vehicles and the like including a support and a member adjustably mounted upon the support for holding the vehicle in different elevated positions, said member having an intermediate portion bowed outwardly and constituting a support for the hub of the vehicle.

23. A shipping device for vehicles including a support, a member having means for engagement with a part of the vehicle mounted upon said support and capable of movement transversely of said support affording a limited longitudinal movement of the vehicle.

24. A shipping device for vehicles including a support, a member having means for engagement with a part of the vehicle mounted upon said support and adjustable longitudinally thereof, said member further being movable transversely of the support affording a longitudinal movement of the vehicle.

25. A shipping device for vehicles including a standard, a member mounted upon said standard and having a portion engageable with a part of a vehicle for supporting the same, said mounting permitting a limited movement of the vehicle relative to the standard, and means for resisting the relative movement between the vehicle and standard.

26. A shipping device for vehicles including a support, a member having one end thereof pivotally connected to said support and having an intermediate bowed portion apertured to receive a part of the vehicle, and means connecting the other end of said member to the support for restraining pivotal movement of said member relative to the support.

In testimony whereof I affix my signature.

WILLIAM W. BLAKELY.